United States Patent Office 2,796,515
Patented June 18, 1957

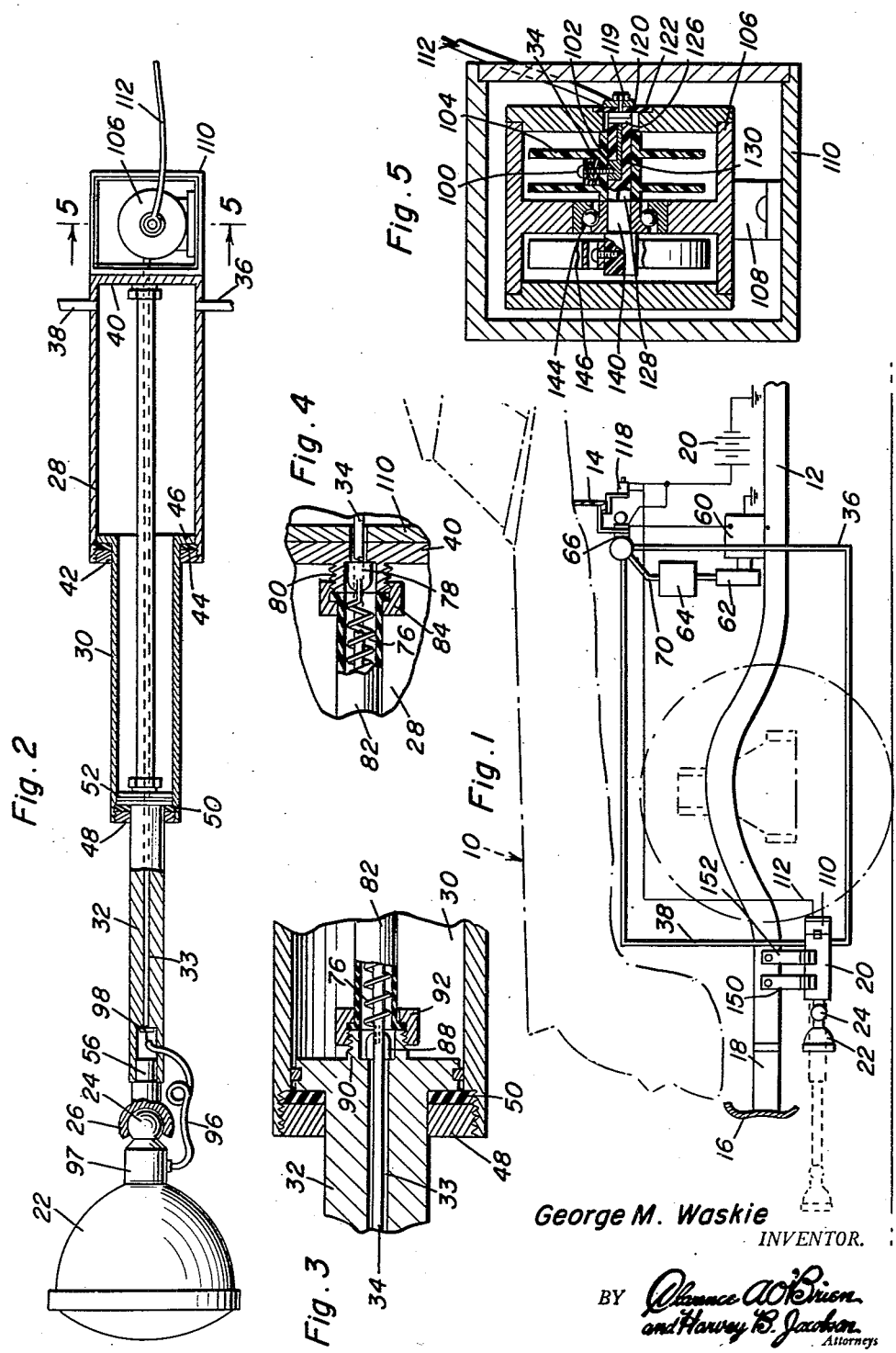

2,796,515

EXTENSIBLE VEHICLE LAMP

George M. Waskie, Wilkes-Barre, Pa.

Application November 7, 1955, Serial No. 545,149

3 Claims. (Cl. 240—7.1)

This invention relates to vehicle attachments and particularly to a telescoping light for automotive vehicles.

An object of this invention is to provide a lamp at the front of an automotive vehicle and below the front bumper thereof, this lamp being extensible forwardly when it is to be used and retracted to a safe position behind the front bumper of the vehicle when it is inoperative, as in the daytime.

Another object of the invention is to provide an improved assembly for mounting the lamp which is extensible in nature, the assembly including provision for passing an electrical conductor through the center thereof, this conductor being wound on a reel when the lamp is retracted and payed from the reel when the lamp is extended forwardly to the position suggested for use.

Another object of the invention is to provide a telescoping lamp for an automotive vehicle as described above, this lamp having hydraulic means for extending it forwardly and resilient means centrally arranged therein for retracting the lamp to the inoperative position of safety behind the front bumper of the vehicle.

A still further object of the invention is to provide an auxiliary lamp for a motor vehicle which is mounted low, preferably beneath the vehicle undercarriage in order to have a maximum of road illumination with a minimum of glare to the oncoming traffic, this lamp being mounted on an assembly capable of extending the lamp forwardly and retracting it to a position beneath the undercarriage where it is safe from injury and possible destruction due to other motor vehicles bumping the front bumper of the vehicle having the lamp thereon.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of a system embodying the principles of the invention, portions of a motor vehicle being shown schematically and other portions being in section and elevation in order to illustrate the suggested and preferred embodiment of the invention;

Figure 2 is a longitudinal sectional view of the telescoping lamp for the motor vehicle;

Figure 3 is an enlarged sectional view showing a detail of the mounting assembly for the lamp;

Figure 4 is a fragmentary sectional view showing a further detail and noting particularly the means for retracting the lamp and for energizing the lamp; and Figure 5 is an enlarged transverse sectional view taken on the plane of line 5—5 of Figure 2.

In the accompanying drawings there is a motor vehicle fragmentarily and schematically shown, this motor vehicle 10 including a frame 12 together with an instrument panel 14 and front bumper 16 mounted by brackets 18 on the frame 12. The vehicle has a standard storage battery 20 that is used as a source of electrical energy to energize the lamp 22 which constitutes a part of the attachment for the motor vehicle 10.

Lamp 22 has a ball 24 at one end of it, this ball being fitted in a socket 26 and frictionally held therein so that the light beam is arranged to illuminate the highway in accordance with the needs or desires of the vehicle operator. To assure that the lamp 22 will remain in the adjusted position, a set screw may be carried by the socket and contact the surface of the ball 24. This is an optional feature.

The mounting assembly for the lamp 22 includes an extensible arrangement of cylinders 28, 30 and 32. The cylinder 32 has a bore 33 in it accommodating an electrical conductor 34 only. The bores of cylinders 28 and 30 accommodate a fluid, such as oil or the same type of fluid in hydraulic brake systems for motor vehicles. The cylinder 28 has an inlet conduit 36 and an outlet conduit 38 in registry and in communication therewith. The inner end has a wall 40 closing it, while the outer end is open and threaded in order to receive the ring 42. This ring has a seal 44 behind it that constitutes a stop for the piston 46, the latter being slidable in the bore of the cylinder 28. This piston is formed at one end of the cylinder 30, the other end being threaded and accommodating a ring 48. This ring has a seal 50 on the inner surface of it and it forms a stop for the piston 52. This piston is formed at one end of the cylinder 32 and constitutes a stop for it. The opposite end of cylinder 32 is hollow and accommodates a stud 56, the latter having a socket 26 fixed to the outer end thereof. Assuming that the three cylinders are nested together and fluid is applied under pressure to the conduit 36, the fluid will force the three cylinders to extend as shown in Figure 2 in order to project the lamp 22 forwardly. In order to supply this fluid under pressure there is a motor 60 carried by the frame of the vehicle, this motor driving a pump 62 which supplies fluid under pressure to the accumulating chamber 64. The fluid is maintained under pressure in the chamber 64 and the motor 60 and pump 62 are used to maintain this condition. Manually operable valve 66 carried by a suitable bracket on the instrument panel 14, is used to open the conduit 36 to cylinder 28. As an alternative construction the valve 66 may have a switch incorporated in the structure thereof, this switch controlling the operation of the electric motor 60. Therefore, when the switch is closed and valve 66 is open, the pump 62 forces liquid into the chamber 64 and through the small conduit 70, valve 66, into the conduit 36. Inasmuch as valve 66 is a three-way valve, during this operation the return conduit 38 is closed. Accordingly, the cylinders 28, 30 and 32 are extended due to the fluid pressure built up therein. Then, when it is desired to return the cylinders to their retracted position, the valve 66 is actuated to its second position allowing fluid to flow through line 38 and directly into the chamber 64. Inasmuch as the motor 60 is not being actuated at this time, the return of the fluid is permissible since the pump 62 is no longer in operation.

The preferred means for returning the cylinders is seen best in Figures 2–4. The means consist of a spring 76 attached at one end to a bracket 78, the latter being secured to the nipple 80 formed in the wall 40 of the cylinder 28. A resilient tube 82 shrouds the spring 76 and is coupled to the nipple 80 by means of a coupling 84 that is threaded on the nipple 80. The opposite end of spring 76 is attached to a bracket 88 that is secured to the cylinder 32 within nipple 90 thereof. Cap 92 holds the opposite end of tube 82 fastened in place on the nipple 90. Accordingly, when the cylinders are extended, the spring 76 is stretched. However, when the fluid in the cylinders is able to be relieved therefrom the spring returns the cylinders to the nested position.

In order to energize the lamp 22, a small flexible conductor 96 is secured to the socket 97 of the lamp 92. The opposite end of this small conductor passes through the hollow end of the cylinder 32 and is soldered to an insulated terminal 98 in this hollow end. Conductor 34 is also connected for electrical conductivity to the terminal 98 and extends through the bore 33 as described previously. This conductor extends completely through the center of spring 76 and through the nipple 80. The inner end of the conductor 34 is attached, as by a screw 100, to a terminal 102 in the hub of reel 104.

This reel is of electrically insulating material and is located in a housing 106, the latter being supported on a bracket 108 in the case 110. Case 110 is fastened as by a clip or by other means, to the wall 40 of cylinder 28. It has an aperture through which the electrical conductor 112 extends. One end of this conductor is operatively connected to a switch 118 on the instrument panel 14, the latter being connected to the battery 20 or other source of electrical energy. The opposite end of conductor 112 is secured by means of a screw 119 to a slip ring 120, the latter being located behind an electrically insulating face plate 122 on the side of casing 106. The second slip ring 126 is disposed at one end of spring 128, being secured thereto. This spindle has a non-circular, for example, square, cross-sectional portion upon which the hub of the electrically insulating reel 104 is mounted. Therefore, there is no relative rotation between the reel 104 and the insulating spindle 128. A conductive strip 130 extends longitudinally through the spindle 128, one end being connected to the slip ring 126 and the other end being secured for electrical conductivity to the screw 100. Inasmuch as this screw 100 is attached for electrical conduction to the wire conductor 34, the electrical energy from the battery 20 is conducted to the lamp 22.

A portion of the spindle 128 is cylindrical, this portion 140 being located in an anti-friction bearing 144 that is carried in a bearing support within case 106. A torsion spring 146 is also located in this case and has one end anchored to the case, while the other end is secured to the spindle.

As seen in Figure 1 suitable brackets 150 and 152 are attached to the cylinder 28 and the frame 12 of the vehicle. They are so arranged that the travel of the light 22 is such as to move from a safe position behind the front bumper 16 to a position considerably in advance of the bumper. This is the preferred extent of travel of the lamp 22 for its operation.

In use the vehicle operator uses the switch 118 in order to energize or turn off the lamp 22. He actuates the combined switch and valve 66 in one direction in order to have the fluid of the hydraulic system flow into the extensibly arranged cylinders. In this way they are extended to the position shown in Figure 2 and at the same time the electrical conductor 34 is payed out from the drum 104. Rotation of the drum in such direction as to permit the paying out of the conductor applies a load to the spring 146. Accordingly, when the valve 66 is turned to another position allowing the escape of fluid from the cylinders, the spring 76 retracts the cylinders while the spring 146 rotates the spindle 140 and winds the conductor 34 on the reel 104.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a motor vehicle which has a frame and a front bumper, an auxiliary lamp, an assembly supporting said lamp beneath said frame and behind said front bumper, said assembly including a plurality of cylinders telescopically connected to each other, fluid pressure means for extending said cylinders, one of said cylinders having said lamp attached thereto so that upon extension of said cylinders said lamp is moved forwardly of said front bumper, means for energizing said lamp carried by said assembly, said energizing means including a wire extending through said cylinders and operatively connected to said lamp, a reel around which said wire is wound, means carried by one of said cylinders supporting said reel for rotation, and means yieldingly opposing the rotation of said reel in one direction so as to cause rotation of said reel in the opposite direction.

2. An auxiliary attachment for use at the front of a motor vehicle, said attachment comprising an extensible support which has a plurality of telescopically connected members, at least two of said members being hydraulic cylinders, means for admitting fluid under pressure into said hydraulic cylinders in order to extend said members, a lamp socket, means securing said lamp socket to one of said members so that upon extension of said members of said support, said lamp socket is moved forwardly of the motor vehicle, a spring attached to the outermost and innermost of said members and arranged to retract said members after having been extended by fluid pressure, said spring being located in said hydraulic cylinders, an electrical conductor extending through the major part of said extensible support and connected with said lamp socket, and protective means in said cylinders through which said electrical conductor passes in order to isolate the electrical conductor from the fluid that is used to actuate said cylinders, said protective means being flexible in order to yield when said support is in the retracted position, and spring loaded means for retracting said electrical conductor at the same time that said support is retracted.

3. The attachment of claim 2 wherein said spring loaded means comprises a reel on which said electrical conductor is adapted to be wound, a support attached to the innermost of said members on which said reel is mounted for rotation, and a spring operatively connected to said reel in order to oppose the operation of said reel in one direction.

References Cited in the file of this patent

UNITED STATES PATENTS

| 1,674,461 | Abell et al. | June 19, 1928 |
| 1,722,683 | Salvino | July 30, 1929 |
| 2,000,743 | Cohen | May 7, 1935 |
| 2,538,655 | Preston | Jan. 16, 1951 |
| 2,662,605 | Riggs | Dec. 15, 1953 |
| 2,750,492 | Young | June 12, 1956 |

FOREIGN PATENTS

| 740,476 | France | Nov. 14, 1932 |
| 629,784 | Germany | Jan. 5, 1935 |
| 989,891 | France | Sept. 14, 1951 |